(12) United States Patent
Walker et al.

(10) Patent No.: US 9,538,228 B2
(45) Date of Patent: *Jan. 3, 2017

(54) METHODS, APPARATUS, AND SYSTEM FOR VENUE-CAST

(71) Applicant: QUALCOMM Incorporated, San Diego, CA (US)

(72) Inventors: Gordon Kent Walker, Poway, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 14/569,849

(22) Filed: Dec. 15, 2014

(65) Prior Publication Data

US 2015/0100990 A1 Apr. 9, 2015

Related U.S. Application Data

(62) Division of application No. 11/678,554, filed on Feb. 23, 2007, now Pat. No. 8,929,870.

(Continued)

(51) Int. Cl.
*H04M 3/00* (2006.01)
*H04N 21/414* (2011.01)
(Continued)

(52) U.S. Cl.
CPC ........ *H04N 21/41415* (2013.01); *H04L 12/18* (2013.01); *H04N 7/15* (2013.01); *H04N 7/162* (2013.01); *H04N 21/21805* (2013.01); *H04N 21/2385* (2013.01); *H04N 21/234327* (2013.01); *H04N 21/41407* (2013.01); *H04N 21/482* (2013.01)

(58) Field of Classification Search
CPC ... H04L 12/18; H04W 8/245; H04M 1/72525; H04M 1/72522
USPC ........................................ 455/418; 348/14.08
See application file for complete search history.

(56) References Cited

U.S. PATENT DOCUMENTS 6,578,203 B1 6/2003 Anderson, Jr. et al.
7,124,425 B1 10/2006 Anderson, Jr. et al.
(Continued)

FOREIGN PATENT DOCUMENTS

JP 2001275101 A 10/2001
JP 2002290844 A 10/2002
(Continued)

OTHER PUBLICATIONS

International Search Report-PCT/US2007/062829, International Search Authority—European Patent Office—Jul. 23, 2007.
(Continued)

*Primary Examiner* — William D Cumming
(74) *Attorney, Agent, or Firm* — The Marbury Law Group, PLLC

(57) ABSTRACT

A communications method for broadcasting an event is provided. This includes generating a plurality of media streams at an event and providing a service to receive the media streams. From the service, an interface can be generated to select a subset of the media streams. Media streams can include audio, video, or other formats that are selected from alternative broadcasting channels provided at the event.

18 Claims, 13 Drawing Sheets

Related U.S. Application Data

(60) Provisional application No. 60/777,532, filed on Feb. 27, 2006.

(51) Int. Cl.

| | | |
|---|---|---|
| *H04L 12/18* | (2006.01) | |
| *H04N 7/16* | (2011.01) | |
| *H04N 21/218* | (2011.01) | |
| *H04N 21/2343* | (2011.01) | |
| *H04N 7/15* | (2006.01) | |
| *H04N 21/2385* | (2011.01) | |
| *H04N 21/482* | (2011.01) | |

(56) References Cited

U.S. PATENT DOCUMENTS

| | | |
|---|---|---|
| 7,149,549 B1 | 12/2006 | Ortiz et al. |
| 7,266,383 B2 | 9/2007 | Anderson |
| 7,376,388 B2 | 5/2008 | Ortiz et al. |
| 8,929,870 B2 * | 1/2015 | Walker ............... H04L 12/18 348/14.08 |
| 8,929,873 B2 | 1/2015 | Jonas et al. |
| 2002/0141447 A1 | 10/2002 | Leung et al. |
| 2003/0033347 A1 | 2/2003 | Bolle et al. |
| 2005/0078170 A1 | 4/2005 | Firestone et al. |
| 2006/0253330 A1 * | 11/2006 | Maggio ............... G06Q 30/02 705/14.2 |
| 2007/0204294 A1 | 8/2007 | Walker et al. |
| 2008/0098301 A1 * | 4/2008 | Black ............... H04L 67/1008 715/246 |

FOREIGN PATENT DOCUMENTS

| | | |
|---|---|---|
| JP | 2003069476 A | 3/2003 |
| JP | 2003097760 A | 4/2003 |
| JP | 2003209880 A | 7/2003 |
| JP | 2005006193 A | 1/2005 |
| KR | 20020006983 A | 1/2002 |
| KR | 20040036621 A | 4/2004 |
| KR | 20040073956 A | 8/2004 |
| KR | 20040104392 A | 12/2004 |
| RU | 2264042 | 11/2005 |
| WO | 03098871 A1 | 11/2003 |

OTHER PUBLICATIONS

Taiwanese Search report—096106671—TIPO—Oct. 27, 2010.
Written Opinion-PCT/US2007/062829, International Search Authority—European Patent Office—Jul. 23, 2007.

* cited by examiner

METHODS, APPARATUS, AND SYSTEM FOR VENUE-CAST

CLAIM OF PRIORITY

The present Application for Patent is a divisional of U.S. patent application Ser. No. 11/678,554 entitled "METHODS, APPARATUS, AND SYSTEM FOR VENUE-CAST" filed Feb. 23, 2007, which claims the benefit of priority to U.S. Provisional Patent Application No. 60/777,532 entitled "VENUECAST SERVICE" filed Feb. 27, 2006, both of which are assigned to the assignee hereof and hereby expressly incorporated by reference herein.

BACKGROUND

I. Field

The following description relates generally to communications systems, and more particularly to broadcasting and selecting various media channels for wireless devices within the confines of a venue such as a sports arena.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems generally utilize one or more base stations that provide a coverage area. A typical base station can transmit multiple data streams for broadcast, multicast and/or uni-cast services, wherein a data stream may be a stream of data that can be of independent reception interest to a user device. A user device within the coverage area of such base station can be employed to receive one, more than one, or all the data streams carried by the composite stream. Likewise, a user device can transmit data to the base station or another user device.

Wireless communication systems may also be implemented to broadcast information related to a specific event, such as a television broadcast of a sporting event, a political speech, or the like. Viewers of such televised or otherwise broadcast events may receive a signal that provides a single view of the event at any given time. Occasionally, a broadcaster may provide a "split-screen" view that shows the event from two angles, however, the viewer, watching the event remotely, is unable to select a desired viewing angle or camera shot. Even viewers attending the event are limited to the viewing angle from their relative position to the event source, or to prescribed camera angles on closed-circuit television screens. Therefore, a need exists in the art for systems and methods that overcome the aforementioned deficiencies and facilitate enhancing user experience in a wireless communication environment.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Multiple media channels and data streams are broadcast within a venue such as a sporting or music event, where users operating mobile devices can receive and select various desired views or other media options as available. In general, sports facilities such as race tracks e.g., NASCAR, Formula I, Kentucky Derby provide many different camera angles or other media streams operating concurrently that can be selected for viewing from a device at such events. Such media streams are also available for other events including football, basketball, baseball, and concerts for example. The viewer at home typically receives a single view that the broadcast network distributes, or perhaps a limited number of views at most due to the large bandwidth employed for high definition (HD) or Standard Definition (SD) transmission to the viewer. For a fan at the event, this need not be the case since many or all of the camera views can be supplied directly to the device or a handset, and more specifically a cell phone or other mobile device.

In one aspect, a venue-cast application is provided that employs mobile broadcast formats, where a subset of media channels including video, audio, text, and so forth are offered to users attending a given venue. In one specific example, a wireless operator may use available communications frequencies and/or other owned spectrum allocation to run the service. In most cases, the viewer of a sporting event is provided a single video version of the event, yet there are often multiple camera views available at the actual venue. These are generally not available even to a person that attends the event, where the jumbo-tron or similar screen runs a single camera view at a time. The multiple channels and associated broadcast formats allow users to select from available and alternative media channels broadcast at a given event to enhance the overall media experience at such events.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate multimedia experiences at live events. In an aspect, a communications method for broadcasting an event is provided. This includes generating a plurality of media streams at an event and providing a service to receive the media streams. From the service, an interface can be generated to select a subset of the media streams. Media streams can include audio, video, or other formats that are selected from alternative broadcasting channels provided at the event. In this manner, wireless operators can supplement their live experiences with various data streams that may depict other views or data not available from a given perspective at the event.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
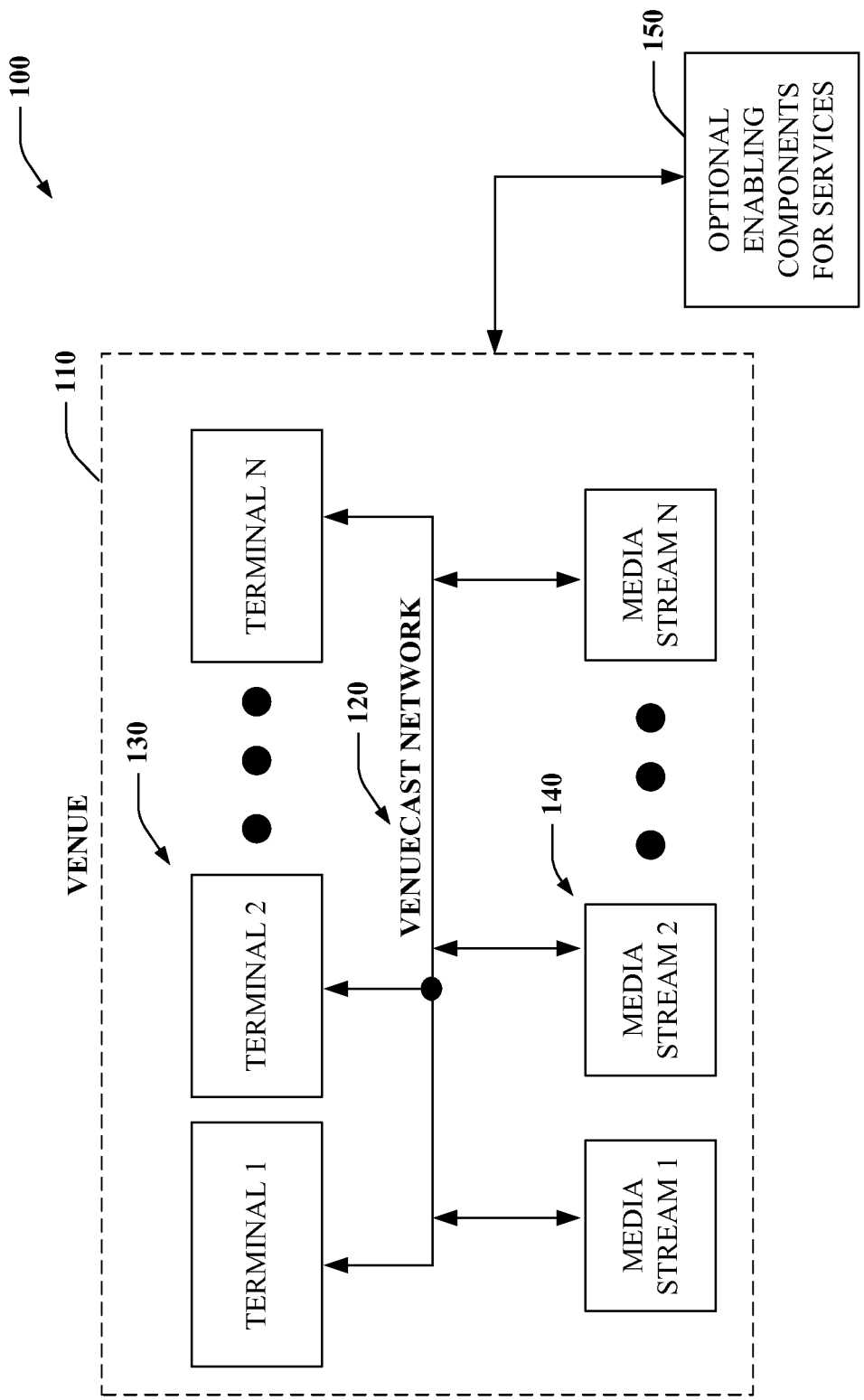
FIG. 1 is a high level block diagram of a system that is provided to illustrate venue casting in a communications environment.

Referring now to FIG. 1, a system 100 illustrates venue casting in a wireless communications environment. A venue 110 provides an area or location where various types of media such as audio, video, text or other form can be generated with respect to an event or with respect to other events. As shown, a venue cast network 120 allows one or more operator or user terminals 130 to receive a plurality of media streams 140 at the venue 110. For example, at a football contest which is played at the venue 110, there may be six different camera views available which can be associated with the media streams 140. At the same event, various audio streams may also be associated with the media streams 140. For instance, home team audio broadcasts and away team audio broadcasts. In yet another example, the media streams 140 may include another form of media such as textual information. For example, the media stream 140 may include out of town scores or other information.

From the available media streams 140, operators of the terminals 130 can select a subset of the streams from which to receive. For example, a first terminal operator at 130 may decide to select camera views one and two as a split screen view on a wireless handset (e.g., cell phone, PDA, laptop PC) and select an out of town audio broadcast from a set of possible audio feeds. As will be described in more detail below, interfaces can be provided on the terminals 130 to allow users to select desired media stream for viewing or listening. In another aspect, notifications can be enabled to allow other sensory reception via the media streams 140. For example, vibrate a phone when out of venue teams score changes as reflected by at least one of the media streams. Other notifications can include substantially any type of output including mechanical, beeps, pop-up displays, and so forth. As shown, optional enabling components 150 can be provided. These components 150 can be provided to limit participation with the venue cast network 120. For example, the terminals 130 may be required to receive an electronic key or other enabling component 150 within the venue 110 before reception of the venue cast network 120 can commence. As will be described in more detail below, location detection components may be employed as the optional enabling component for respective venue cast services.

In one specific example, an attendee at an event can have an enhanced experience by a wireless service provider operating a signal on a dedicated frequency inside the venue 110. These services can be offered in conjunction with an existing network, if desired. The venue cast content over the network 120 and supplied by the media streams 140 may be treated as a separate network, or as an integral part of the service offering of an existing network. The separate network method provides the most independence between the large area network and the venue cast network 120, however at the cost of operating at least two media distribution systems (MDS) i.e., one for each network. A second aspect integrates the venue cast content over the network 120 into a single shared network. This may be more robust as the presence of venue cast locations is easily discovered by the device or terminals 130 from a local operator infrastructure (LOI) waveform, which announces the locations as available RF signals per BCS and content Retailer. The terminal 130 can infrequently check for presence of a venue cast carrier, while in a LOI with venue cast network 120 signals present. There can be issues associated with individuals obtaining access to the venue cast network 120 from outside the venue. If contractually obligated to do so, the operator or user of the terminal 130 may have to physically request keys (or other enabler 150) required for the event at a kiosk or similar booth inside the venue as will be described in more detail below. Bluetooth or other similar short range communications can be employed for receiving enabling codes and so forth. The requirement for limiting access to the network 120 may be that only individuals physically within the sports facility in question are allowed to subscribe. Specific methods involving terminal positioning may be applied as will be described in more detail below.

The terminals 130, which can be, for instance, a module such as an SD card, a network card, a wireless network card, a computer (including laptops, desktops, personal digital assistants PDAs), mobile phones, smart phones, or any other suitable terminal that can be utilized to access the network 120. Generally, the terminals 130 access the network 120 by way of an access node or nodes (not shown) within the venue. For instance, the terminals 130 can be communicatively coupled to an access node by way of a wired connection, such as an Ethernet cable, a USB connection, etc. In another example, a connection between the terminals 130 and access node may be wireless in nature, in which the access node may be a base station and the terminals may be a wireless. For instance, terminals 130 and access node may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to the terminals 130, the access node can be an access node associated with a wired network or a wireless network. To that end, the access node can be, for instance, a router, a switch, or the like. The access node can include one or more interfaces, e.g., communication modules, for communicating with other network nodes. Additionally, access node may be a base station (or wireless access point in the venue 110) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals 130 within the venue 110.

Figure 2:
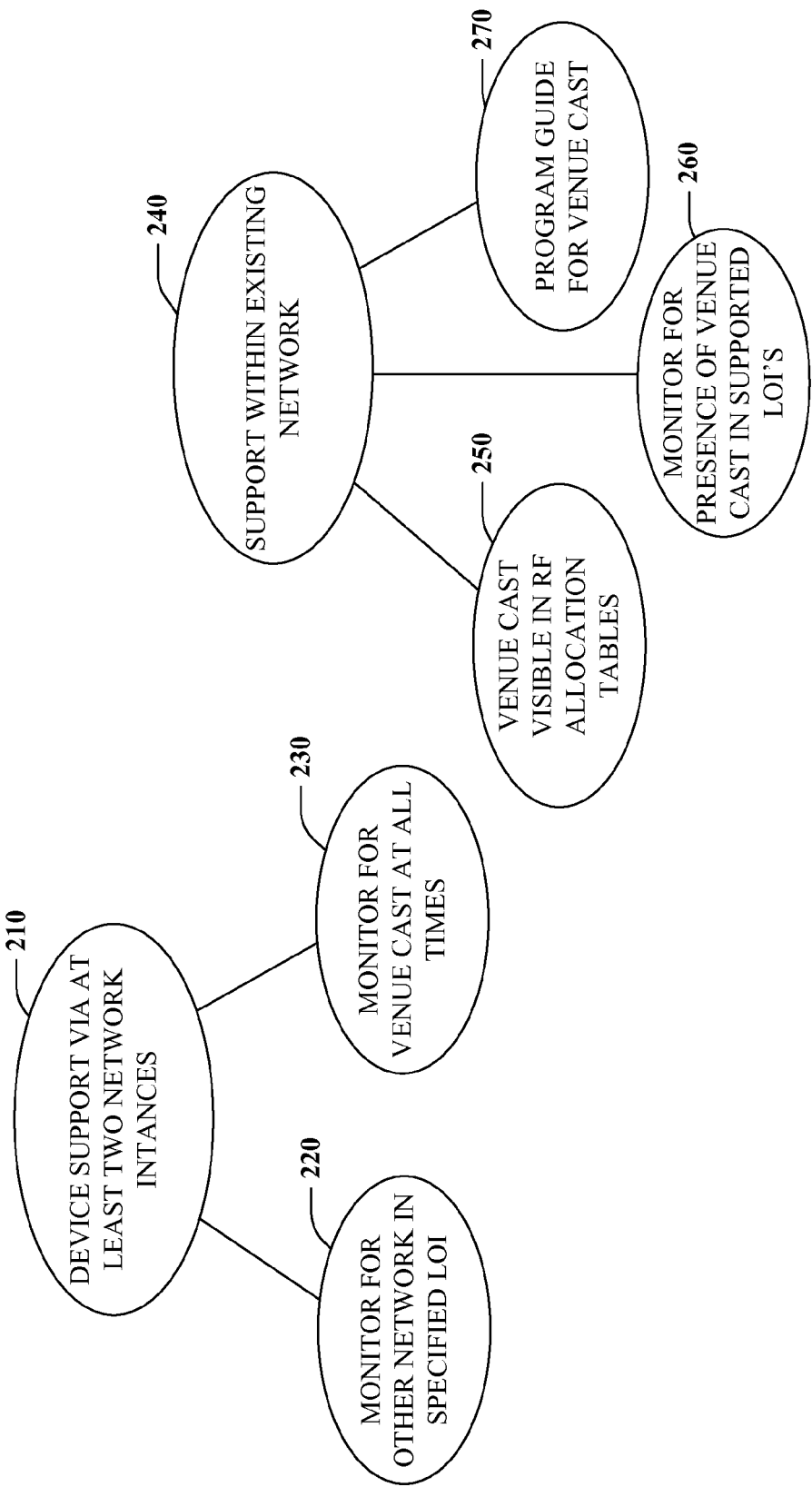
FIG. 2 is a diagram of an example network support options for a device.

Referring now to FIG. 2, example network support options for a device in a venue cast environment are illustrated. In this aspect, monitoring modes for how devices can receive venue cast signals are described. Proceeding to 210, device support for venue cast via two network instances (or more) with a merged guide offering can be provided. This can include where a device (or terminal) monitors at 220 for at least a second network in specified LOI(s) of a large area network, for example. The type of monitoring provided at 220 may be considered as more power efficient on the device for receiving venue cast signals. At 230, the device can monitor for venue cast signals at substantially all available times. This option at 230 facilitates lower network side complexity.

Proceeding to 240, support options for venue cast broadcasting within an existing network are considered. This can include allowing presence of venue cast to be visible within radio frequency (RF) allocation tables of the network at 250, for example. Another support aspect of venue cast 240 within existing networks includes having devices monitor for presence of venue cast signals at 260 in LOI(s) that support venue cast broadcasting. At 270, a program guide that can be offered as part of a terminal interface allows multiple instances of venue cast within a single LOI. Thus, in an aspect, different event sites can appear as different channels where an exact listing may be distributed at the venue and is distributed in band. Generally, for device side behavior, no additional network components are required. Therefore, devices that do not support the venue cast frequency band(s) do not display the respective venue cast channels. In another aspect, positioning systems can be employed to locate whether or not a device is in range of one or more available venue cast networks.

Figure 3:
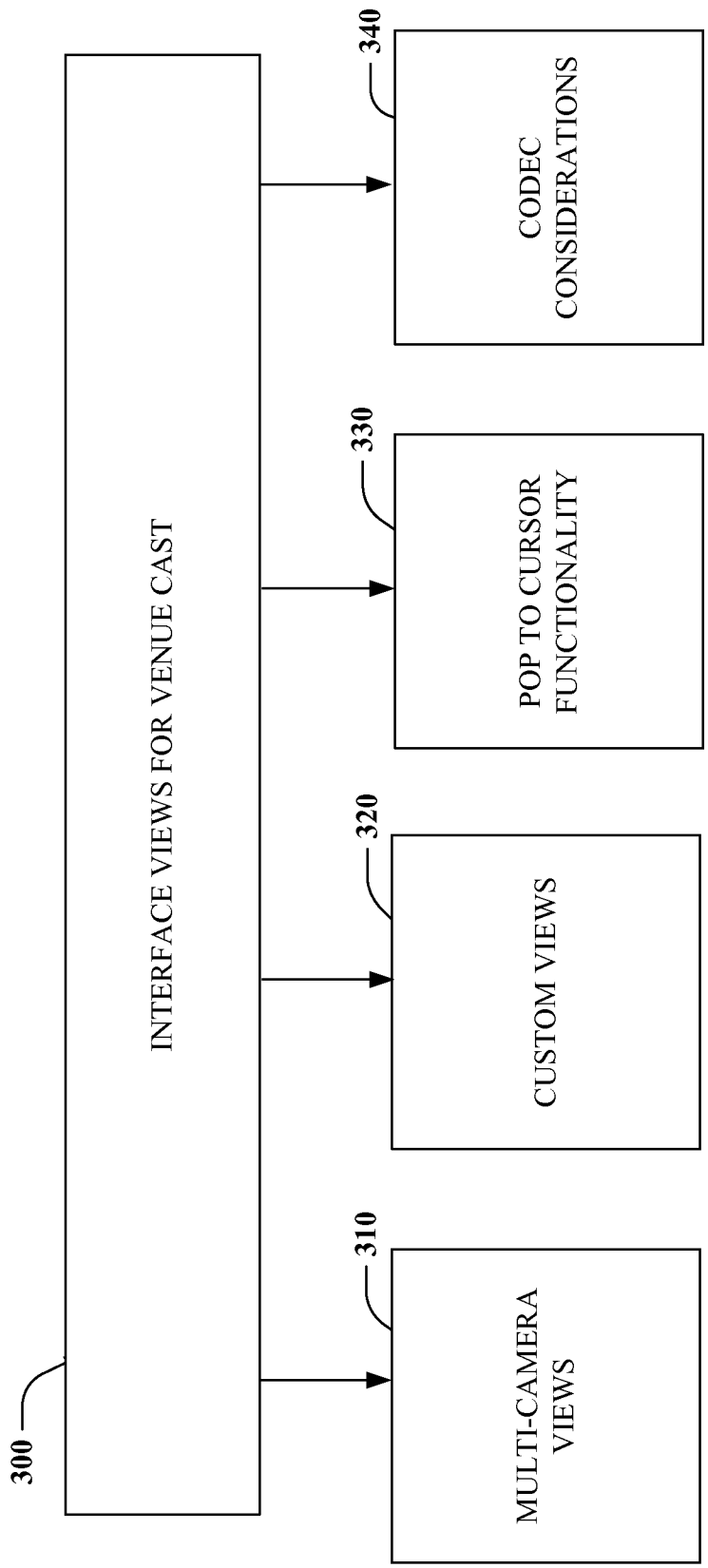
FIG. 3 illustrates an example interface considerations for a venue cast device.

Referring to FIG. 3, example interface considerations 300 for a venue cast device are illustrated. In this aspect, some of the options for selecting and viewing available venue cast media streams are described. At 310, multiple camera views are considered for venue cast applications. As noted previously, other media than video can also be provided. Generally, guide views or interfaces can be provided for the venue cast suite of media signals. This includes building a scroll list for multi-camera views at 310 e.g., 4:1 or N:1, and so forth. Multi-camera views may be built into the handset that decodes multiple media streams concurrently. Alternatively, this can also include decoding of select packets or layers of multiple streams if multi-view video coding is employed.

Multi-camera views at 310 may be sent as a separately encoded stream or as a single 3DAV or multi-view coded stream, for example that involves prediction among views in addition to spatial and temporal prediction. A multi-view quarter, quarter video graphics array (QQVGA) panel may be used as a base layer of a spatially layered codec at QVGA for example. Alternatively, the views at 310 may be coded at QQVGA resolution and on selection of a given view, providing enhanced up-sampling to QVGA to restore quality for a single view. Yet another aspect is if the base to enhancement layer bandwidth ratio is adapted to 1:3 or 1:4 for example. In this case, the base layer may carry the primary view and enhancement layer may carry one to many secondary views. Base and enhancement layers may be decoded to receive substantially all views and base layer only may be decoded for the primary view.

Proceeding to 320, custom views can be provided and received across a venue cast network. For example, custom views may include possibly slower frame or update rate view—potentially enhanced through frame interpolation or FRUC and pre-coded multi-view at full frame rate. As can be appreciated, screen or views can be mixed. Thus, one portion of a screen on a terminal may display a regular frame rate view and another portion of a terminal screen may display a custom view 320. Proceeding to 330, the interface views 300 may include an integrated "pop to" cursor mode. This includes a highlighted view that may be in acquisition for the next second (or other time), and allows quick pop to full view mode of the desired or selected media stream. Multi-views can remain in acquisition for quick pop back to multi-view of all media streams from full view of a selected subset of media streams.

At 340, codec considerations for terminals can include low latency encoding that may be employed (e.g., maximum of a couple seconds) due to sports application or other real time event considerations. In another case, I data for the associated video codec may be carried in a separate media logic channel (MLC) to reduce power consumption for holding multiple channels in acquisition at the same time. Thus, for an equivalent to 1 second frame rate, switch frames may be substituted for a respective I frame, for example. A similar method may also be employed for physical layers, such as DVB-H via specific configuration, such as all I frames in a common burst pattern which may be less efficient than forward link only broadcasts.

Figure 4:
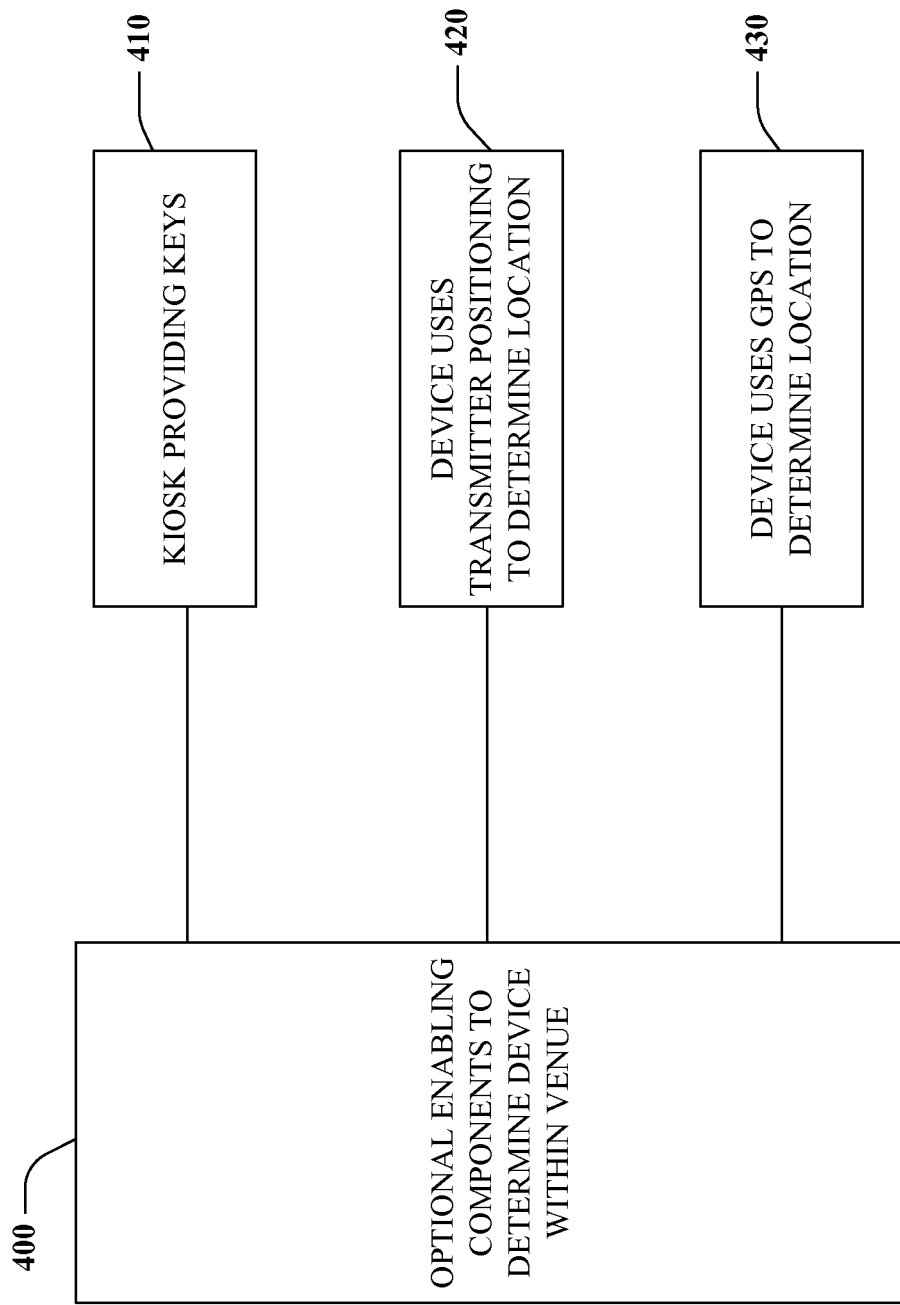
FIG. 4 illustrates optional device enabling considerations for a venue cast environment.

Turning now to FIG. 4, optional device enabling considerations 400 for a venue cast environment are provided. In this aspect, limitations for which devices may be able to receive venue cast signals are described. As noted above, potential enabling components such as electronic keys may be employed to limit reception of venue cast signals to paid participants of an event or otherwise valid subscribers to the event. At 410, an optional means to assure the device is inside the venue, beyond limited coverage of venue cast transmitter can include a Kiosk at the event that provides unit encrypted keys for the event inside the facility. The Kiosk 410 may use paper or may use Bluetooth or other short range verification frequency. In one example, the bar code on a ticket may be scanned (by device or kiosk) and employed as part of a subscription enabler to the service.

At 420, enabling of a device may include employing positioning of the device to determine its location. This may employ multiple transmitters within the venue or concurrent support of large area and venue cast. At 430, a device may employ a global positioning satellite (GPS) positioning to determine location and thus confirm that it is enabled for the respective event. With GPS positioning for determining device locations, outdoor locations may be best suited for GPS location technologies. As can be appreciated, substantially any technology that enables devices within the venue to receive venue cast signals and to exclude devices outside the venue can be employed.

Figure 5:
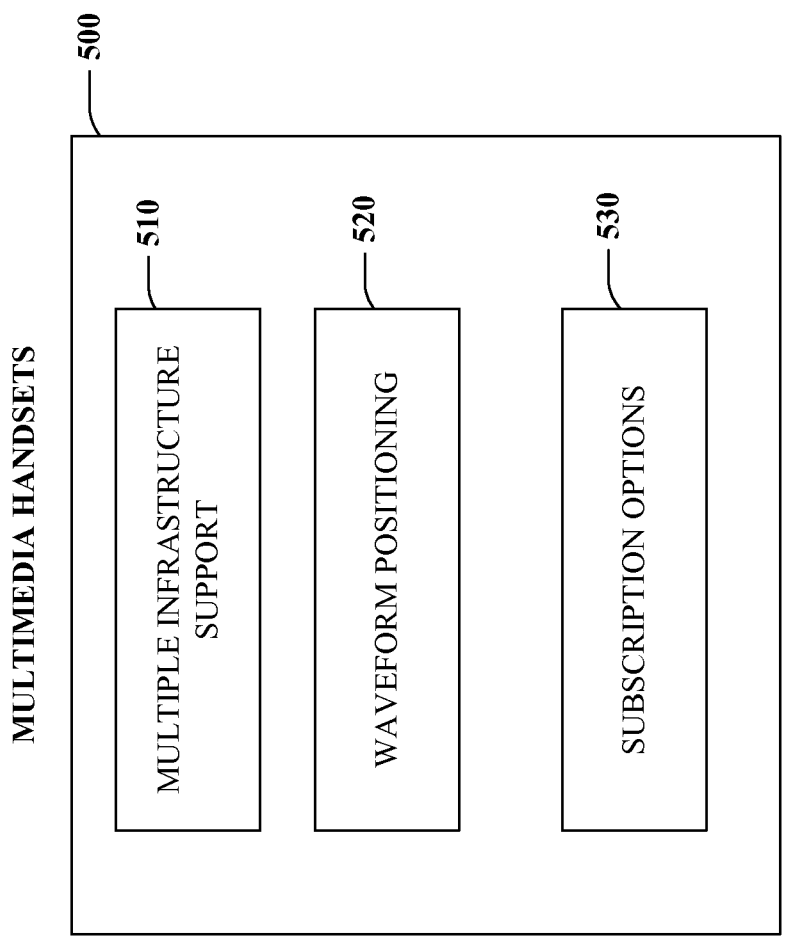
FIG. 5 illustrates multimedia handset considerations for a venue cast device.

Referring, to FIG. 5, multimedia handset considerations for a venue cast device 500 are illustrated. In this aspect, nuances with support for venue cast signals at the device 500 are considered. Proceeding to 510, device infrastructure support is considered. In multimode (multiple multimedia physical layers) the handset 500, venue cast and large area networks do not have to share the same physical layer. Thus, handsets 500 may be used for venue cast within a digital video broadcasting (DVB-H) infrastructure or a digital media broadcasting (T-DMB) infrastructure, for example. As can be appreciated, additional infrastructure permutations are possible. At 520, waveform positioning for devices are provided. In this aspect, positioning can be built into the respective waveforms that support venue cast. This can include a fast acquisition via layer synchronization signals and provide features such as an all I and switch frame media logic channel (MLC). At 530, subscription options can be provided for the handset 500. As noted previously, venue casting maybe offered as a subscription on any method that is supported e.g., per event IPPV, or seasonally. Due to the nature of broadcasting contractual obligations, per event key delivery may be required to limit participation of venue cast to ticketed or subscribing customers. In general, the handset 500 can be employed as part of a system that provides features to execute a multi-view, simulcast system at a venue and integrate such views with an existing mobile multimedia to handset network offering. Hybrid applications are also possible where some components of the handset support venue cast applications and other components of the handset support non-venue cast applications such as voice and text messaging for example.

Figure 6:
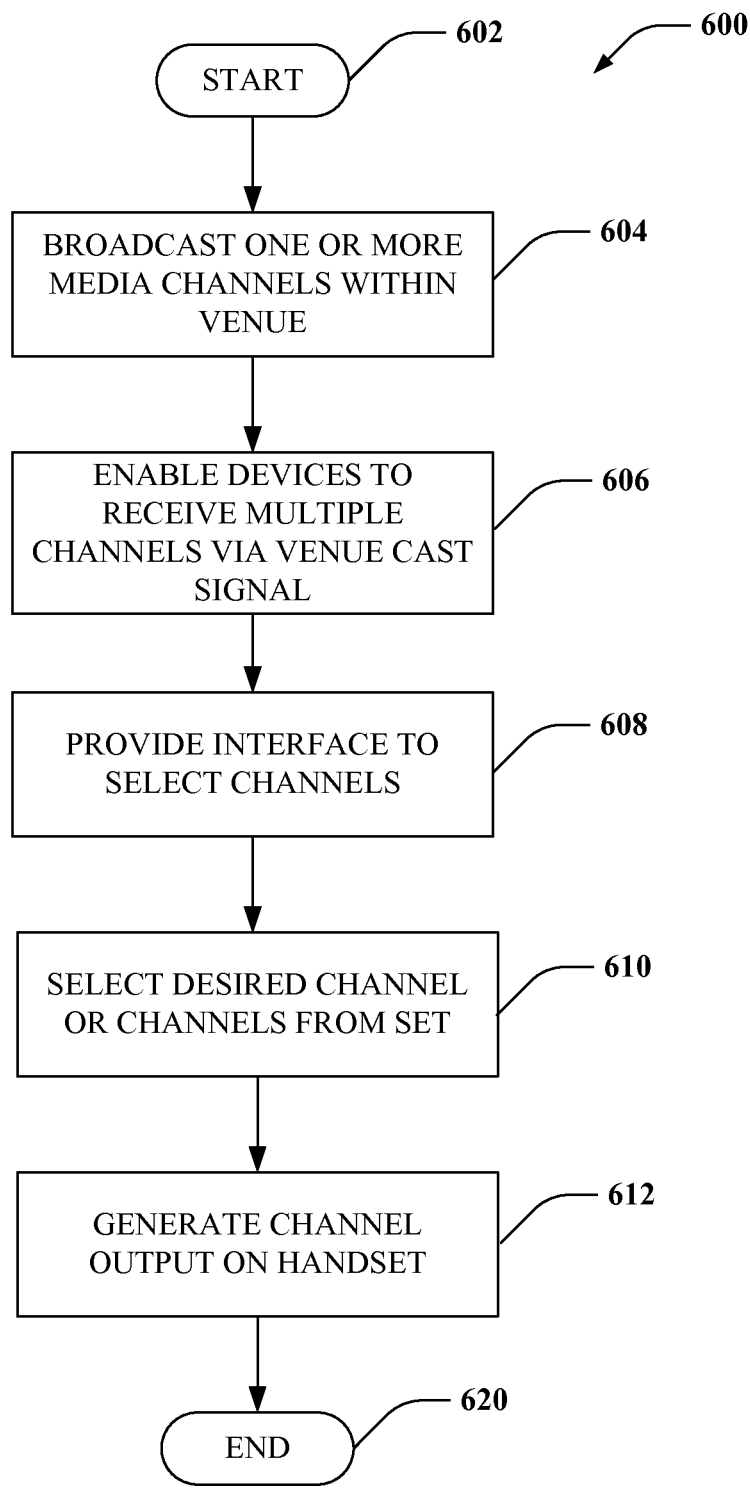
FIG. 6 illustrates an example venue cast process.

Referring to FIG. 6, a venue cast process 600 is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 602, the process starts, where various media streams are broadcast according to one or more channels or layers at 604. As noted above, such media streams can include video streams for multiple camera angles, audio streams for alternative listening experiences, or other data streams such as textual streams for reviewing information in accordance with or peripheral to the event. At 606, devices are enabled to receive multiple channels or data streams via a venue cast signal or suite of signals. This can include optionally enabling devices at the event to limit participation of venue cast signals to subscribing customers.

As noted previously, kiosks can be provided to receive enabling keys at the respective devices or other means can include using available positioning technologies to determine that a device is within the boundaries defined for a given venue.

At 608, interfaces are provided for devices to select from available media options provided at the venue. This can include pop to cursor displays that show a set of available signals than can be selected, where device control buttons can be employed to select a subset for viewing or other media experience. For instance, from a set of four available media views, device control buttons could select a subset of views for a split screen display of a single view for full screen display. Proceeding to 610, desired views or media streams are selected from the interface provided at 608. At 610, after a media option is selected, media output is generated for a respective handset or terminal. At 620, the process 600 ends or repeats at 602 as other media options are determined and selected.

Figure 7:
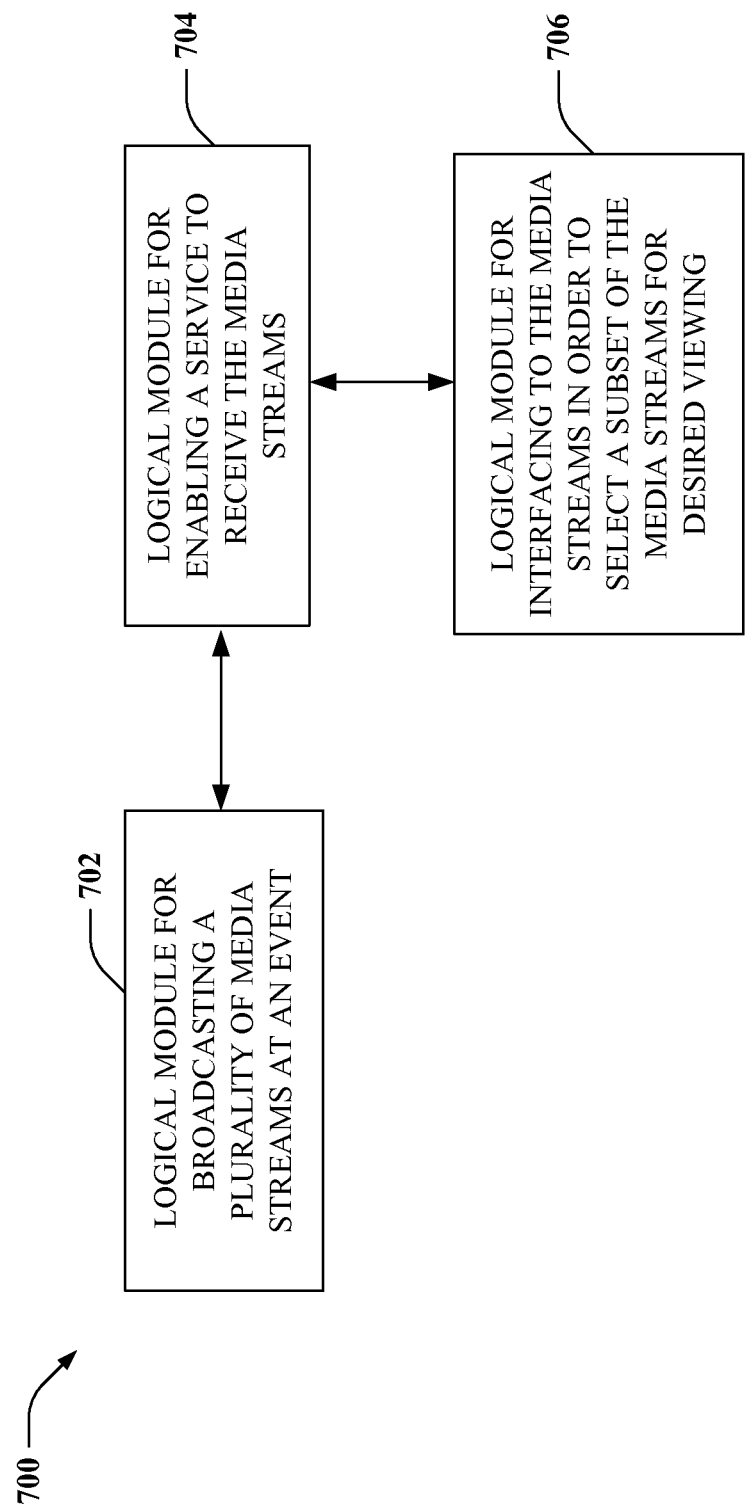
FIGS. 7 and 8 illustrate example logical modules for processing sequence messages and registrations.
Figure 8:
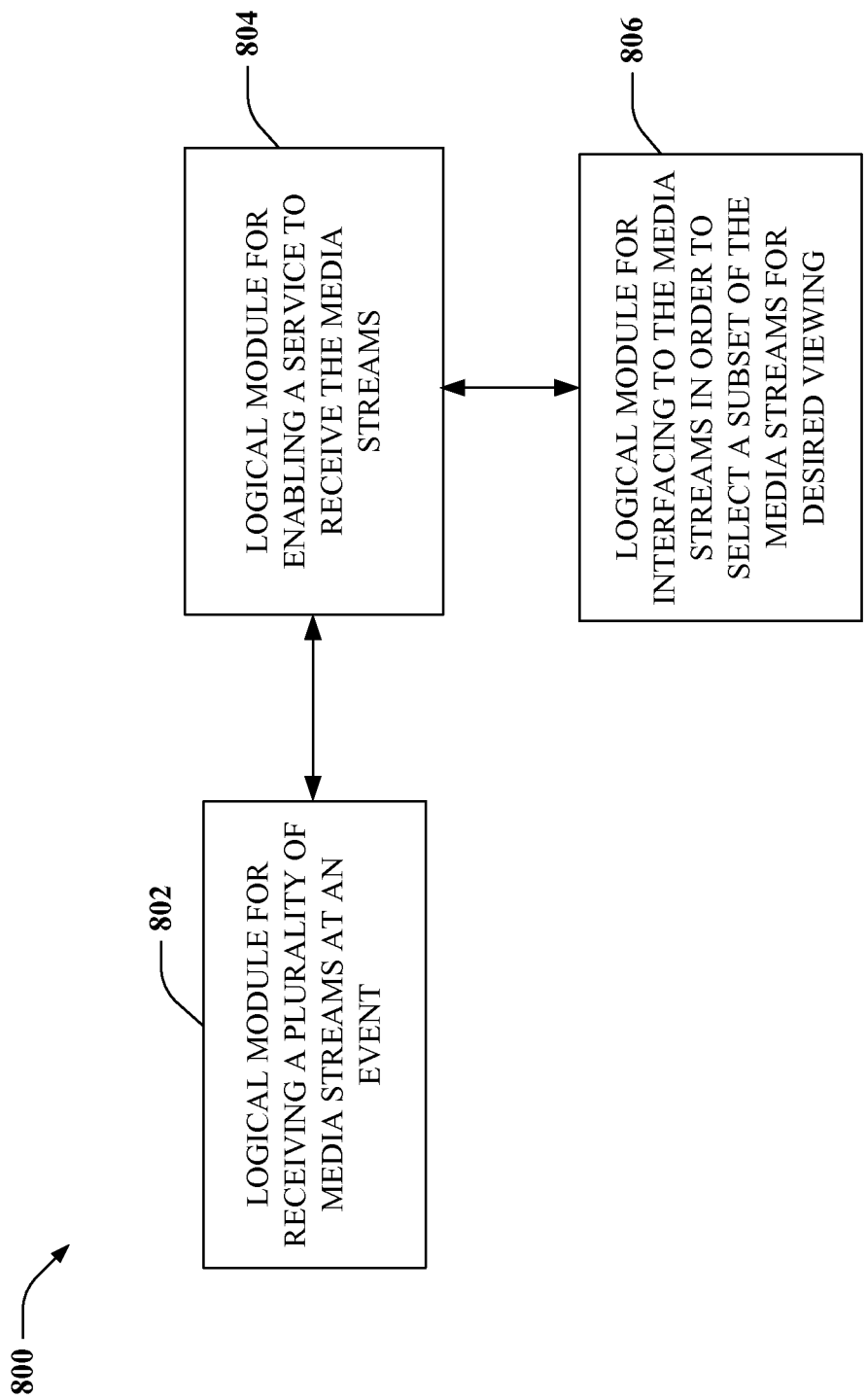

Turning now to FIGS. 7 and 8 collectively, systems are provided that relate to venue cast broadcasting with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 7, a system 700 that facilitates communications across a venue cast network. The system 700 includes a logical module 702 for broadcasting a plurality of media streams at an event and a logical module 704 for enabling a service to receive the media streams. A logical module 706 can be employed for interfacing to the media streams in order to select a subset of the media streams for desired viewing.

Now referring to FIG. 8, a system 800 that facilitates communications from a receiving device across a venue cast network. The system 800 includes a logical module 802 for receiving a plurality of media streams at an event and a logical module 804 for enabling a service to receive the media streams. A logical module 806 can be utilized for interfacing to the media streams in order to select a subset of the media streams for desired viewing.

Figure 9:
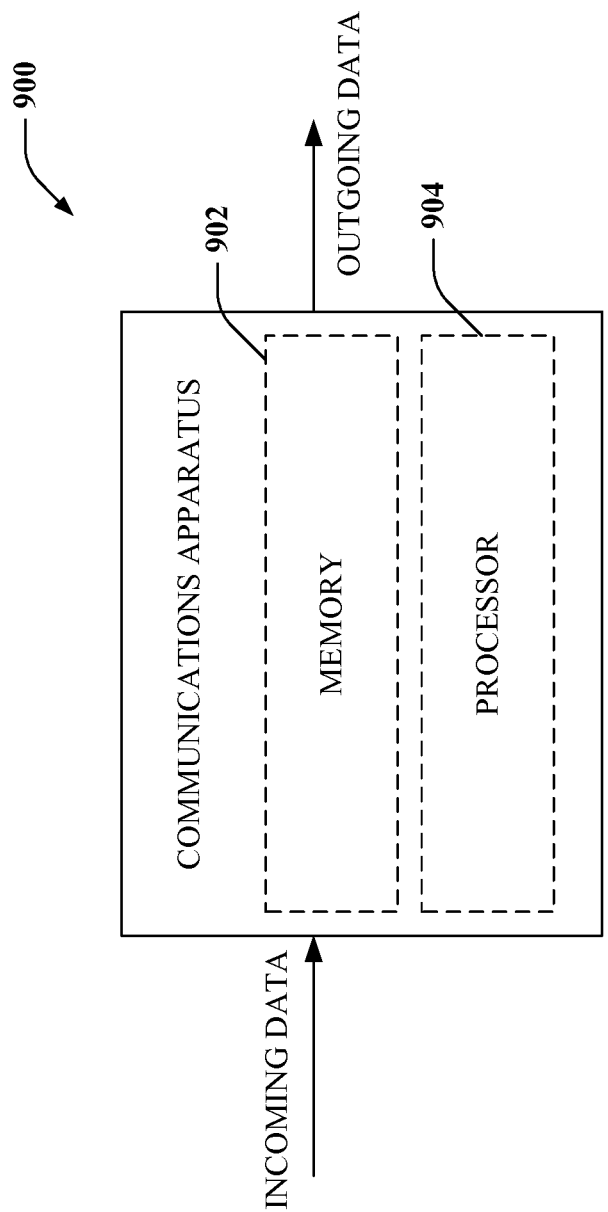
FIG. 9 illustrates an example communications apparatus that employs sequential data to form communications links.

FIG. 9 illustrates a communications apparatus 900 that can be a wireless communications apparatus, for instance, such as a wireless terminal Additionally or alternatively, communications apparatus 900 can be resident within a wired network. Communications apparatus 900 can include memory 902 that can retain instructions for configuring such apparatus with respect to venue cast data for a terminal (and traffic flows associated therewith). Additionally, communications apparatus 900 may include a processor 904 that can have several modules or units to execute instructions within memory 902 and/or instructions received from another network device, wherein the instructions can relate to configuring communications apparatus 900 or a related communications apparatus. For example, the processor can execute an interface where available venue cast options can be selected. After a given selection, for instance if a single view is selected, the respective camera angle associated with the selection can be displayed as a full screen option on the respective apparatus 900.

Figure 10:
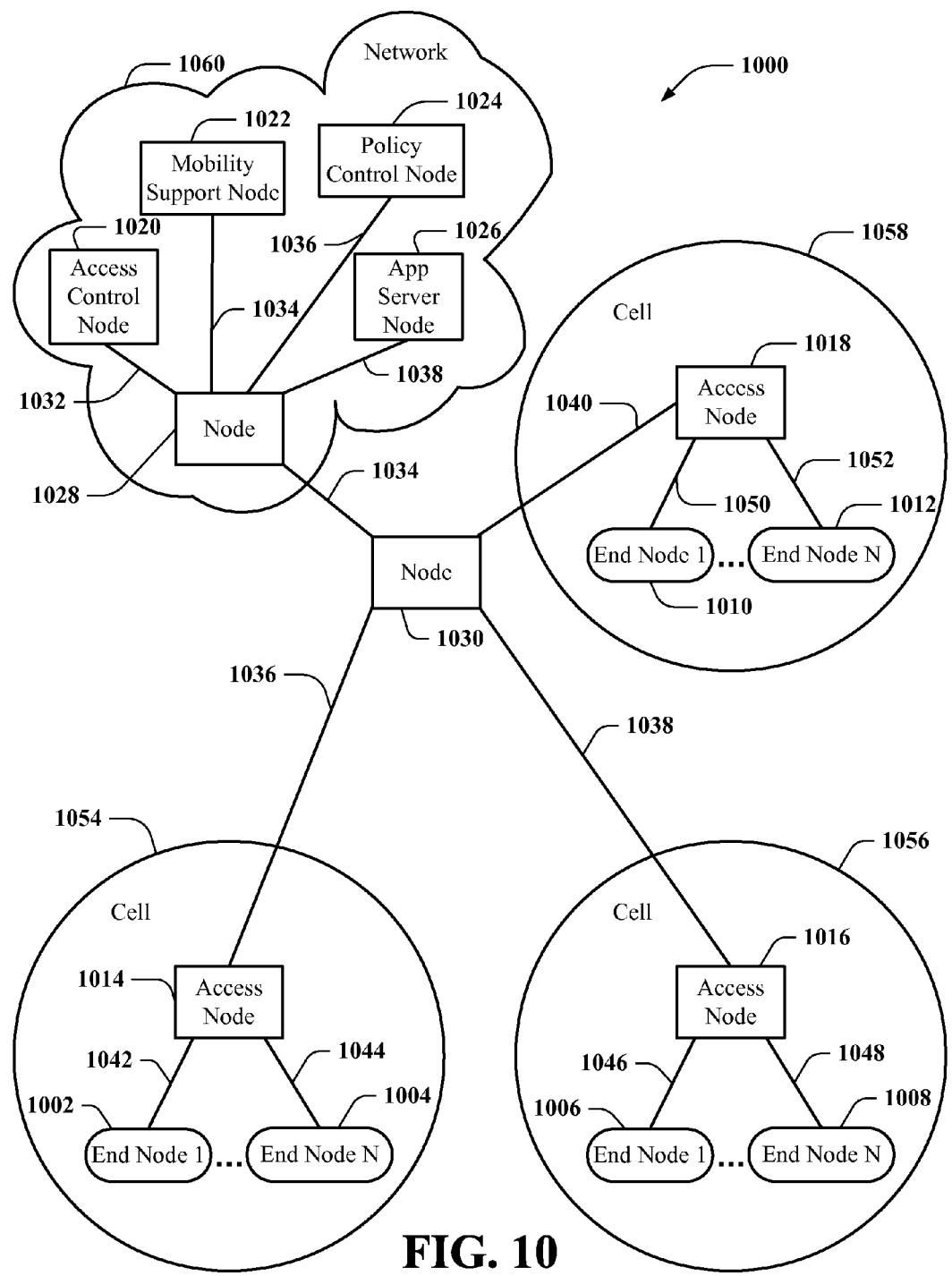
FIG. 10 illustrates an example communications system.

To provide additional context for one or more embodiments described herein, FIG. 10 is provided to illustrate an example communication system 1000 that comprises a plurality of nodes interconnected by communications links. The system 1000 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1000 exchange information using signals, e.g., messages, based on communication protocols, e.g., the Internet Protocol (IP). The communications links of the system 1000 may be implemented, for example, using wires, fiber optic cables, and/or wireless communications techniques. The system 1000 includes a plurality of end nodes 1002-1012, which access the communication system 1000 by way of a plurality of access nodes 1014-1018. End nodes 1002-1012 may be, e.g., wireless communication devices or terminals, and the access nodes 1014-1018 may be, e.g., wireless access routers or base stations. Communication system 1000 also includes a number of other nodes 1020-1030 that are used to provide interconnectivity or to provide specific services or functions.

Communications system 1000 depicts a network 1060 that includes access control node 1020, mobility support node 1022, policy control node 1024, and application server node 1026, all of which are connected to an intermediate network node 1028 by a corresponding network link 1032-1038, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1022, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1024, e.g., a policy server or Policy Decision Point (PDP), supports policy authorization for services or application layer sessions. In some embodiments, application server node 1026, e.g., a Session Initiation Protocol server, streaming media server, or other application layer server, supports session signaling for services available to end nodes and/or provides services or content available to end nodes.

Intermediate network node 1028 in network 1060 provides interconnectivity to network nodes that are external from the perspective of network 1060 by way of network link 1034. Network link 1034 is connected to intermediate network node 1030, which provides further connectivity to access nodes 1014, 1016, and 1018 by way of network links 1036-1040, respectively. Each access node 1014-1018 is depicted as providing connectivity to end nodes 1002-1012, respectively, by way of corresponding access links 1042-1052, respectively. In communication system 1000, each access node 1014-1018 is depicted as using wireless technology, e.g., wireless access links, to provide access. Wired technology may also be utilized, however, in connection with provision of access. A radio coverage area, e.g., communications cells 1054-1058 of each access node 1014-1018, is illustrated as a circle surrounding the corresponding access node.

Communication system 1000 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1000. Additionally, some of the functional entities depicted in communication system 1000 may be omitted or combined. Location or placement of these functional entities may also be varied.

Figure 11:
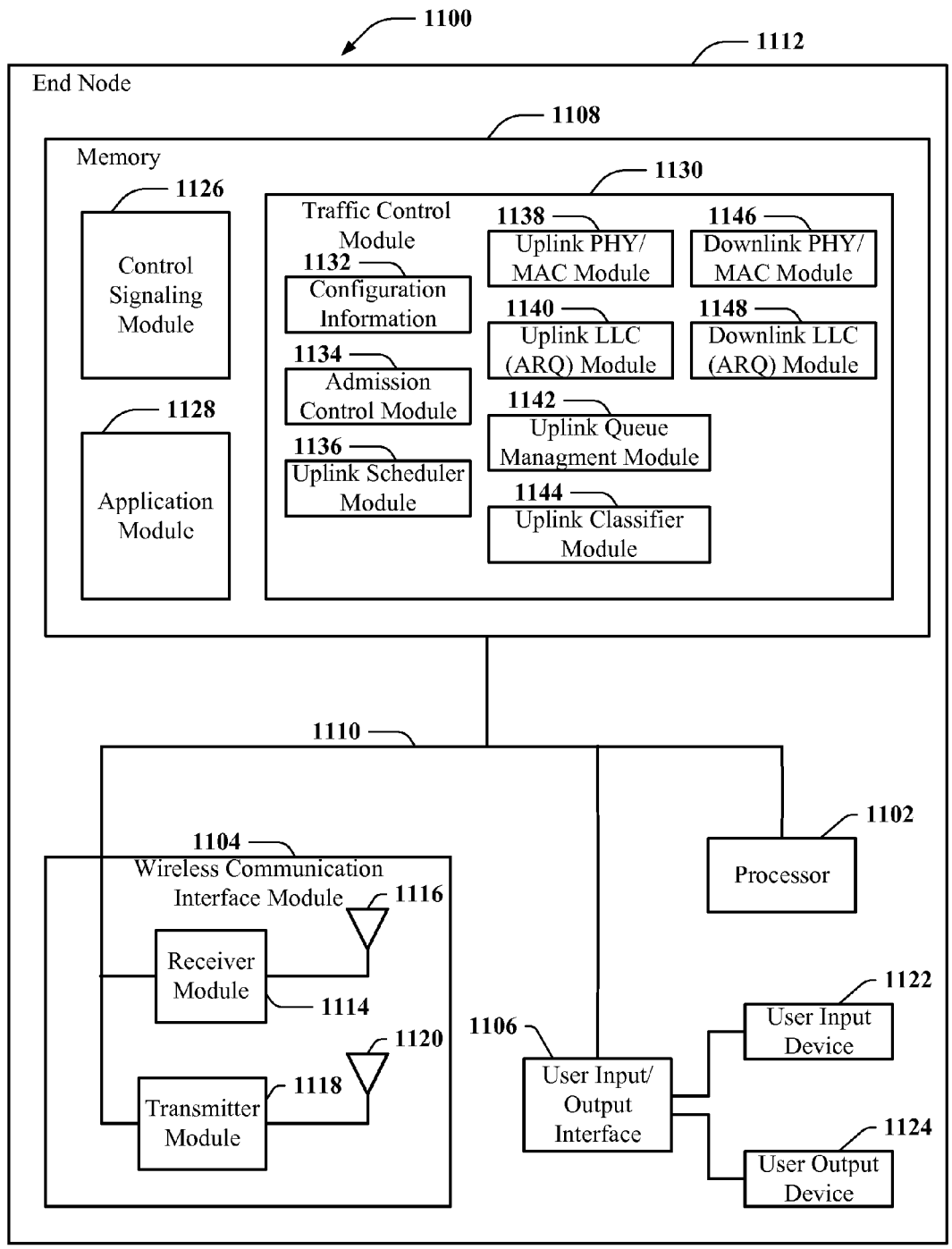
FIG. 11 illustrates an example end node.

FIG. 11 provides an illustration of an example end node 1100, e.g., wireless terminal. End node 1100 is a representation of an apparatus that may be used as any one of end nodes 1002-1012 (FIG. 10). End node 1100 includes a processor 1102, a wireless communication interface module 1104, a user input/output interface 1106 and memory 1108 coupled together by a bus 1110. Accordingly, by way of bus 1110, the various components of the end node 1100 can exchange information, signals and data. Components 1102-1108 of end node 1100 can be located inside a housing 1112.

Wireless communication interface module 1104 provides a mechanism by which the internal components of end node 1100 can send and receive signals to/from external devices and network nodes, e.g., access nodes. Wireless communication interface module 1104 includes, e.g., a receiver module 1114 with a corresponding receiving antenna 1116 and a transmitter module 1118 with a corresponding transmitting antenna 1120 used for coupling end node 1100 to other network nodes, e.g., by way of wireless communications channels.

End node 1100 also includes a user input device 1122, e.g., keypad, and a user output device 1124, e.g., display, which are coupled to bus 1110 through user input/output interface 1106. Thus, user input/output devices 1122 and 1124 can exchange information, signals and data with other components of end node 1100 by way of user input/output interface 1106 and bus 1110. User input/output interface 1106 and associated devices 1122 and 1124 provide mechanisms by which a user can operate end node 1100 to accomplish various tasks. In particular, user input device 1122 and user output device 1124 provide functionality that allows a user to control end node 1100 and applications, e.g., modules, programs, routines and/or functions, that execute in memory 1108 of end node 1100.

Processor 1102, under control of various modules, e.g., routines, included in memory 1108 controls operation of end node 1100 to perform various signaling and processing. The modules included in memory 1108 are executed on startup or as called by other modules. Modules may exchange data, information, and signals when executed. Modules may also share data and information when executed. Memory 1108 of end node 1100 includes a control signaling module 1126, an application module 1128, and a traffic control module 1130, which further includes configuration information 1132 and various additional modules.

Control signaling module 1126 controls processing relating to receiving and sending signals, e.g., messages, for controlling operation and/or configuration of various aspects of end node 1100 including, e.g., traffic control module 1130 as well as configuration information 1132 and various additional modules included. In some embodiments, control signaling module 1126 can include state information, e.g., parameters, status and/or other information, relating to operation of end node 1100 and/or one or more signaling protocols supported by control signaling module 1126. In particular, control signaling module 1126 may include configuration information, e.g., end node identification information and/or parameter settings, and operational information, e.g., information about current processing state, status of pending message transactions, etc.

Application module 1128 controls processing and communications relating to one or more applications supported by end node 1100. In some embodiments, application module 1128 processing can include tasks relating to input/output of information by way of the user input/output interface 1106, manipulation of information associated with an application, and/or receiving or sending signals, e.g., messages, associated with an application. In some embodiments, application module 1128 includes state information, e.g., parameters, status and/or other information, relating to operation of one or more applications supported by application module 1128. In particular, application module 1128 may include configuration information, e.g., user identification information and/or parameter settings, and operational information, e.g., information about current processing state, status of pending responses, etc. Applications supported by application module 1128 include, e.g., Voice over IP (VoIP), web browsing, streaming audio/video, instant messaging, file sharing, gaming, etc.

Traffic control module 1130 controls processing relating to receiving and sending data information, e.g., messages, packets, and/or frames, through wireless communication interface module 1104. The example traffic control module 1130 includes configuration information 1132 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1130 follows.

An admission control module 1134 maintains information relating to resource utilization/availability and determines if sufficient resources are available to support QoS parameters desirably associated with particular traffic flows. Resource availability information maintained by admission control module 1134 includes, e.g., packet and/or frame queuing capacity, scheduling capacity, as well as processing and memory capacity needed to support one or more traffic flows. Control signaling module 1126, application module 1128, and/or other modules included in end node 1100 may query admission control module 1134 to determine if sufficient resources are available to support a new or modified traffic flow, where the admission control determination is a function of QoS parameters of the particular traffic flow and QoS parameters defined within a profile. Configuration information 1132 can include configuration information, e.g., parameters settings, that affect the operation of admission control module 1134, e.g., an admission control threshold value that indicates percentage of resource that may be allocated prior to rejecting additional requests.

An uplink scheduler module 1136 controls processing relating to transmission scheduling, e.g., order and/or timing, and allocation of transmission resources, e.g., information coding rate, transmission time slots, and/or transmission power, for data information, e.g., messages, packets, and/or frames, to be sent by way of wireless communication interface module 1104, e.g., from end node 1100 to an access node. Uplink scheduler module 1136 can schedule transmissions and allocate transmission resources as a function of QoS parameters associated with one or more traffic flows. In some embodiments, scheduling and/or resource allocation operations performed by uplink scheduler module 1136 are additionally a function of channel conditions and other factors, e.g., power budget.

An uplink PHY/MAC module 1138 controls physical (PHY) layer and Media Access Control (MAC) layer processing relating to sending data information, e.g., messages, packets, and/or frames, by way of wireless communication interface module 1104, e.g., from end node 1100 to an access node. For instance, operation of uplink PHY/MAC module 1138 includes both sending and receiving control information, e.g., signals or messages, to coordinate sending of data information, e.g., messages, packets, and/or frames. Configuration information 1132 can include configuration information, e.g., parameters settings, that affect the operation of uplink PHY/MAC module 1138, e.g., a frequency, band, channel, spreading code or hoping code to be used for transmissions, an identifier associated with end node 1100, a request dictionary prescribing use of an assignment request channel, etc.

An uplink LLC (ARQ) module 1140 controls Logical Link Control (LLC) layer processing relating to sending data information, e.g., messages, packets, and/or frames, through wireless communication interface module 1104, e.g., from end node 1100 to an access node. Uplink LLC (ARQ) module 1140 includes processing associated with Automatic Repeat Request (ARQ) capabilities, e.g., retransmission of lost packets or frames. Uplink LLC (ARQ) module 1140 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 1140 can additionally perform fragmentation of higher layer messages, e.g., packets, into multiple sub-portions, e.g., frames to be sent by uplink PHY/MAC module 1140. Configuration information 1132 can include configuration information that affect operation of uplink LLC (ARQ) module 1140, e.g., an ARQ window size, maximum number of retransmissions, a discard timer, etc.

An uplink queue management module 1142 maintains information and controls processing relating to storage of data information to be sent by way of wireless communication interface module 1104, e.g., from end node 1100 to an access node. Uplink queue management module 1142 can, for example, control storage of data information awaiting transmission and maintain state information regarding data information awaiting transmission on a per traffic flow basis, e.g., packets associated with each traffic flow may be stored in separate queues. For instance, uplink queue management module 1142 supports a variety of queue management techniques and/or capabilities, e.g., head drop, tail drop, as well as various Active Queue Management (AQM) mechanisms such as Random Early Detection (RED). Configuration information 1132 can include configuration information that affects operation of uplink queue management module 1142, such as a queue limit, drop strategy, and/or AQM thresholds associated with one or more traffic flows.

An uplink classifier module 1144 controls processing relating to identification of data information as belonging to particular traffic flows prior to being sent by way of the wireless communication interface module 1104, e.g., from end node 1100 to an access node. In some embodiments, messages, packets, and/or frames to be sent through utilization of wireless communication interface module 1104 are classified as belonging to one of a variety of traffic flows by uplink classifier module 1144 based on inspection of one or more header and/or payload fields. Results of classification by uplink classifier module 1144 can affect the treatment of classified data information by uplink queue management module 1142 as well as other modules within memory 1108. For example, the results may determine a particular queue the message, packet, and/or frame will be associated with for storage and further affect subsequent processing such as scheduling. Configuration information can include configuration information that affect operation of uplink classifier module 1144, e.g., a set of one or more classifier filter rules that prescribe criteria used to associate data information, e.g., messages, packets, and/or frames, as belonging to one or more traffic flows.

A downlink PHY/MAC module 1146 controls PHY layer and MAC layer processing relating to receiving data information by way of wireless communication interface module 1104. Operation of downlink PHY/MAC module 1146 can include both sending and receiving control information to coordinate receiving of data information. Configuration information 1104 can include configuration information that affect operation of downlink PHY/MAC module 1146, e.g., a frequency, band, channel, spreading code or hoping code to be used for reception, an identifier associated with end node 1100, etc.

A downlink LLC (ARQ) module 1148 controls LLC layer processing relating to receiving data information by way of wireless communication interface module 1104. Downlink LLC (ARQ) module 1148 includes processing associated with ARQ capabilities, e.g., retransmission of lost packets or frames. For example, downlink LLC (ARQ) module 1148 can further include processing relating to an LLC header and/or trailer that encapsulates higher layer messages, which provides additional functionality, e.g., multi-protocol multiplexing/demultiplexing through a type field or error detection by way of a checksum field. Downlink LLC (ARQ) module 1148 can also perform reassembly of frames received by the downlink PHY/MAC module 1146 into higher layer messages. Configuration information 1132 can, and in some embodiments does, include configuration information, e.g., parameters settings, that affect operation of downlink LLC (ARQ) module 1148, e.g., an ARQ window size, maximum number of retransmissions, a discard timer, etc.

Figure 12:
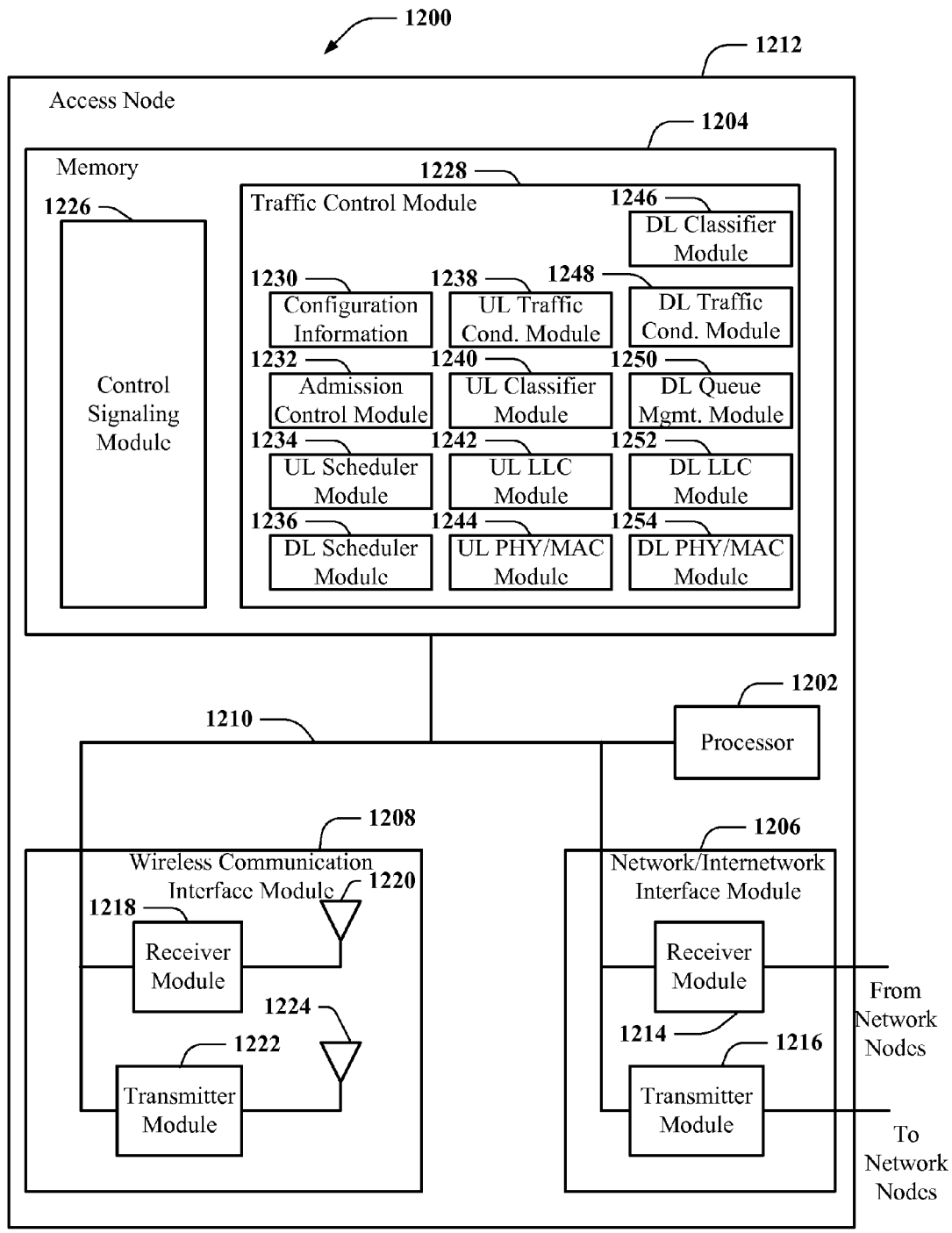
FIG. 12 illustrates an example access node.

FIG. 12 provides a detailed illustration of an example access node 1200 implemented in accordance with the present invention. The access node 1200 is a detailed representation of an apparatus that may be used as any one of the access nodes 1014-1018 depicted in FIG. 10. In the FIG. 12 embodiment, access node 1200 includes a processor 1202, memory 1204, a network/internetwork interface module 1206 and a wireless communication interface module 1208, coupled together by bus 1210. Accordingly, by way of bus 1210 the various components of access node 1200 can exchange information, signals and data. The components 1202-1210 of access node 1200 are located inside a housing 1212.

Network/internetwork interface module 1206 provides a mechanism by which the internal components of access node 1200 can send and receive signals to/from external devices and network nodes. Network/internetwork interface module 1206 includes a receiver module 1214 and a transmitter module 1216 used for coupling node 1200 to other network nodes, e.g., through copper wires or fiber optic lines. Wireless communication interface module 1208 also provides a mechanism by which the internal components of access node 1200 can send and receive signals to/from external devices and network nodes, e.g., end nodes. Wireless communication interface module 1208 includes, e.g., a receiver module 1218 with a corresponding receiving antenna 1220 and a transmitter module 1222 with a corresponding transmitting antenna 1224. Wireless communication interface module 1208 is used for coupling access node 1200 to other nodes, e.g., by way of wireless communication channels.

Processor 1202 under control of various modules, e.g., routines, included in memory 1204 controls operation of access node 1200 to perform various signaling and processing. The modules included in memory 1204 are executed on startup or as called by other modules. Modules may exchange data, information, and signals when executed. Modules may also share data and information when executed. In the FIG. 12 embodiment, memory 1204 of access node 1200 includes a control signaling module 1226 and a traffic control module 1228, which further includes configuration information 1230 and various additional modules 1232-1254.

Control signaling module 1226 controls processing relating to receiving and sending signals, e.g., messages, for controlling operation and/or configuration of various aspects of access node 1200 including, e.g., traffic control module 1228 as well as configuration information 1230 and the various additional modules included therein 1232-1254. For instance, control signaling module 1226 includes state information, e.g., parameters, status and/or other information, relating to operation of access node 1200 and/or one or more signaling protocols supported by control signaling module 1226. In particular, control signaling module 1226 may include configuration information, e.g., access node identification information and/or parameter settings, and operational information, e.g., information about current processing state, status of pending message transactions, etc.

Traffic control module 1228 controls processing relating to receiving and sending data information, e.g., messages, packets, and/or frames, by way of wireless communication interface module 1208. For instance, traffic control module can include configuration information 1230 as well as various additional modules 1232-1254 that control various aspects of quality of service for packets and/or traffic flows, e.g., associated sequences of packets. In some embodiments, traffic control module 1228 includes state information, e.g., parameters, status and/or other information, relating to operation of access node 1200, traffic control module 1228, and/or one or more of the various additional modules included therein 1232-1254. Configuration information 1230, e.g., parameter settings, determines, affects and/or prescribes operation of traffic control module 1228 and/or the various additional modules included therein 1232-1254. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 1228 follows.

Admission control module 1232 maintains information relating to resource utilization/availability and determines if sufficient resources are available to support quality of service requirements of particular traffic flows. Resource availability information maintained by admission control module 1232 includes, e.g., packet and/or frame queuing capacity, scheduling capacity, as well as processing and memory capacity needed to support one or more traffic flows. Control signaling module 1226 and/or other modules included in access node 1200 can query admission control module 1232 to determine if sufficient resources are available to support a new or modified traffic flow, where the admission control determination is a function of the quality of service requirements of the particular traffic flow and/or the available resources. Configuration information 1230 can include configuration information, e.g., parameters settings, that affect the operation of admission control module 1232, e.g., an admission control threshold value that indicates the percentage of resource that may be allocated prior to rejecting additional requests.

Uplink scheduler module 1234 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 1208. Uplink scheduler module 1234 can schedule transmissions and allocate transmission resources as a function of the quality of service requirements and/or constraints associated with one or more traffic flows and/or one or more end nodes. Configuration information 1230 can include configuration information that affect the operation of uplink scheduler module 1234, e.g., a priority, rate bound, latency bound, and/or sharing weight associated with one or more traffic flows and/or end nodes. In some embodiments, scheduling and/or resource allocation operations performed by uplink scheduler module 1234 are additionally a function of channel conditions and other factors, e.g., power budget.

Downlink scheduler module 1236 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 1200 to one or more end nodes through wireless interface module 1208. Downlink scheduler module 1236 can schedule transmissions and allocate transmission resources as a function of the quality of service requirements and/or constraints associated with one or more traffic flows and/or one or more end nodes. Configuration information 1230 can include configuration information that affects the operation of downlink scheduler module 1236, e.g., a priority, rate bound, latency bound, and/or sharing weight associated with one or more traffic flows and/or end nodes. In some embodiments, scheduling and/or resource allocation operations performed by the downlink scheduler module 1236 are additionally a function of channel conditions and other factors, e.g., power budget.

Uplink traffic conditioner module 1238 controls processing relating to traffic conditioning, e.g., metering, marking, policing, etc., for data information, e.g., messages, packets, and/or frames, received by way of wireless interface module 1208, e.g., from an end node to access node 1200. Uplink traffic conditioner module 1238 can condition traffic, e.g., meter, mark and/or police, as a function of the quality of service requirements and/or constraints associated with one or more traffic flows and/or one or more end nodes. Configuration information 1230 can include configuration information that affects the operation of uplink traffic conditioner module 1238, e.g., a rate bound, and/or marking value associated with one or more traffic flows and/or end nodes.

Uplink classifier module 1240 controls processing relating to identification of data information, e.g., messages, packets, and/or frames, received through wireless interface module 1208, e.g., from an end node to access node 1200, as belonging to particular traffic flows prior to being processed by uplink traffic conditioner module 1238. In some embodiments, messages, packets, and/or frames received through wireless communication interface module 1208 are classified as belonging to one of a variety of traffic flows by uplink classifier module 1240 based on inspection of one or more header and/or payload fields. The results of classification by uplink classifier module 1240 can affect the treatment of the classified data information, e.g., messages, packets, and/or frames, by uplink traffic conditioner module 1238, e.g., the results may determine a particular data structure or state machine the message, packet, and/or frame will be associated with and further affect subsequent processing such as metering, marking, and/or policing. Configuration information 1230 can include configuration information that affects the operation of uplink classifier module 1240, e.g., a set of one or more classifier filter rules that prescribe criteria used to associate data information, e.g., messages, packets, and/or frames, as belonging to one or more traffic flows.

Uplink LLC (ARQ) module 1242 controls LLC layer processing relating to receiving data information, e.g., packets and/or frames, by way of wireless communication interface module 1208, e.g., from an end node to access node 1200. Uplink LLC (ARQ) module 1242 includes processing associated with ARQ capabilities, e.g., retransmission of lost packets or frames. In some embodiments, uplink LLC (ARQ) module 1242 further includes processing relating to an LLC header and/or trailer that encapsulates higher layer messages, e.g., packets, which provides additional functionality, e.g., multi-protocol multiplexing/demultiplexing through a type field or error detection by way of a checksum field. Uplink LLC (ARQ) module 1242 can also perform reassembly of frames received by uplink PHY/MAC module 1244 into higher layer messages, e.g., packets. The configuration information 1230 can include configuration information that affects the operation of uplink LLC (ARQ) module 1242, e.g., an ARQ window size, maximum number of retransmissions, a discard timer, etc.

Uplink PHY/MAC module 1244 controls PHY layer and MAC layer processing relating to receiving data information, e.g., packets and/or frames, by way of wireless communication interface module 1208, e.g., from an end node to access node 1200. In some embodiments, operation of uplink PHY/MAC module 1244 includes both sending and receiving control information, e.g., signals or messages, to coordinate receiving of data information, e.g., messages, packets, or frames. Configuration information 1230 can include configuration information that affects the operation of uplink PHY/MAC module 1244, e.g., a frequency, band, channel, spreading code or hopping code to be used for reception, an identifier associated with access node 1200, etc.

Downlink classifier module 1246 controls processing relating to identification of data information, e.g., messages, packets, and/or frames, as belonging to particular traffic flows prior to being sent through wireless communication interface module 1208, e.g., from access node 1200 to an end node. In some embodiments, messages, packets, and/or frames to be sent by way of wireless communication interface module 1208 are classified as belonging to one of a variety of traffic flows by downlink classifier module 1246 based on inspection of one or more header and/or payload fields. The results of classification by downlink classifier module 1246 can affect the treatment of the classified data information, e.g., messages, packets, and/or frames, by downlink queue management module 1250 and other modules 1248, 1252, and 1254, e.g., the results may determine a particular queue the message, packet, and/or frame will be associated with for storage and further affect subsequent processing such as scheduling. Configuration information 1230 can include configuration information, e.g., parameters settings, that affect the operation of downlink classifier module 1246, e.g., a set of one or more classifier filter rules that prescribe criteria used to associate data information, e.g., messages, packets, and/or frames, as belonging to one or more traffic flows.

Downlink traffic conditioner module 1248 controls processing relating to traffic conditioning, e.g., metering, marking, policing, etc., for data information, e.g., messages, packets, and/or frames, to be sent by way of wireless interface module 1208, e.g., from access node 1200 to an end node. Downlink traffic conditioner module 1248 can condition traffic, e.g., meter, mark and/or police, as a function of the quality of service requirements and/or constraints associated with one or more traffic flows and/or one or more end nodes. Configuration information 1230 can include configuration information that affects the operation of downlink traffic conditioner module 1248, e.g., a rate bound, and/or marking value associated with one or more traffic flows and/or end nodes.

Downlink queue management module 1250 maintains information and controls processing relating to storage of data information, e.g., messages, packets, and/or frames, to be sent by way of wireless communication interface module 1208, e.g., from access node 1200 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 1250 supports a variety of queue management techniques and/or capabilities, e.g., head drop, tail drop, as well as various AQM mechanisms such as RED. Configuration information 1230 can include configuration information that affects the operation of downlink queue management module 1250, e.g., a queue limit, drop strategy, and/or AQM thresholds associated with one or more traffic flows.

Downlink LLC (ARQ) module 1252 controls LLC layer processing relating to sending data information, e.g., messages, packets, and/or frames, by way of wireless communication interface module 1208, e.g., from access node 1200 to an end node. Downlink LLC (ARQ) module 1252 includes processing associated with ARQ capabilities, e.g., retransmission of lost packets or frames. In some embodiments, downlink LLC (ARQ) module 1252 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 1252 can also perform fragmentation of higher layer messages, e.g., packets, into multiple sub-portions, e.g., frames to be sent by downlink PHY/MAC module 1254. Configuration information 1230 can include configuration information that affects the operation of downlink LLC (ARQ) module 1252, e.g., an ARQ window size, maximum number of retransmissions, a discard timer, etc.

Downlink PHY/MAC module 1254 controls PHY layer and MAC layer processing relating to sending data information, e.g., messages, packets, and/or frames, by way of wireless communication interface module 1208, e.g., from access node 1200 to an end node. In some embodiments, operation of downlink PHY/MAC module 1254 includes both sending and receiving control information, e.g., signals or messages, to coordinate sending of data information, e.g., messages, packets, or frames. Configuration information 1230 can include configuration information that affects the operation of downlink PHY/MAC module 1254, e.g., a frequency, band, channel, spreading code or hoping code to be used for transmissions, an identifier associated with the access node 1200, etc.

Figure 13:
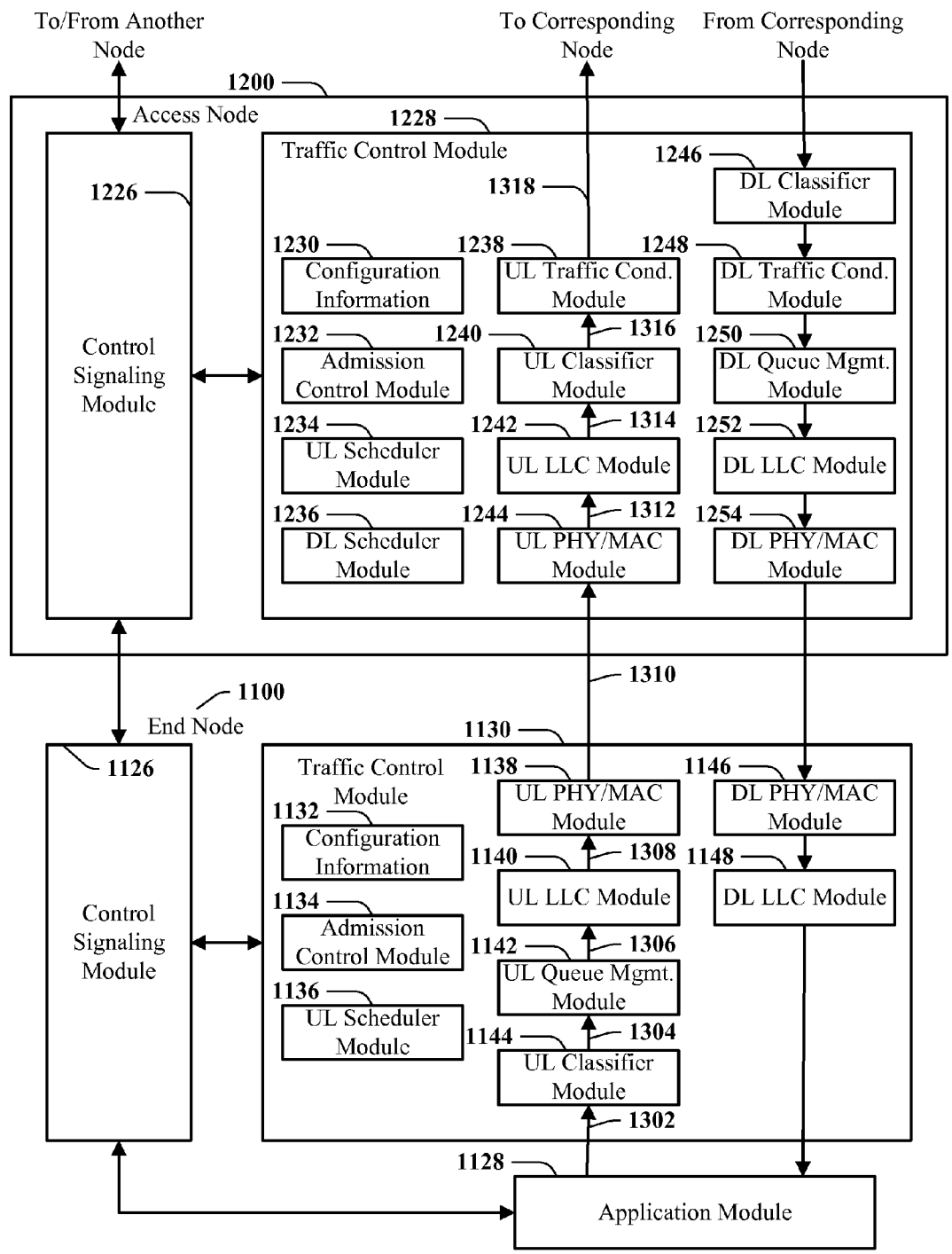
FIG. 13 illustrates an example end node communicating with an example access node.

FIG. 13 illustrates example signaling and traffic flows between various modules included in example end node 1100 and example access node 1200. The FIG. 13 end node 1100 and FIG. 13 access node 1200 are simplified representations of the FIG. 11 end node 1100 and FIG. 12 access node 1200, respectively. The FIG. 13 example shows application module 1128 sending and receiving data information, e.g., traffic flows comprising a sequence of messages, packets, or frames. In the context of the FIG. 10 example system, the FIG. 13 end node 1100 may be any one of end nodes 1002-1012 depicted in FIG. 10 and the application module 1128 included in the FIG. 13 end node 1100 may be exchanging data information with another node in the system, e.g., another end node 1002-1012 or the application server node 1026 as depicted in FIG. 10. In FIG. 13 and the subsequent description, the node with which the FIG. 13 end node 1100 is exchanging data information is referred to as the corresponding node.

The data information, e.g., traffic flows comprising a sequence of messages, packets, or frames, sent from the application module 1128 in the end node 1100 to a corresponding node is shown by a sequence of arrows 1302-1308 to proceed through a sequence of modules 1138-1144 included in end node 1100 for processing, after which the data information is sent from the end node 1100 to the access node 1200, e.g., by way of wireless communication interface module 1104. Following reception by access node 1200, e.g., by way of wireless communication interface module 1208, the data information, e.g., traffic flows comprising a sequence of messages, packets, or frames, sent from the application module 1128 in end node 1100 to the corresponding node is shown by a sequence of arrows 1310-1318 to proceed through a sequence of modules 1238-1244 included in access node 1200 for processing, prior to being forwarded from the access node 1200 toward the corresponding node, e.g., directed in accordance with routing information to an intermediate node connected to the access node by way of network/internetwork interface module 1206.

The data information, e.g., traffic flows comprising a sequence of messages, packets, or frames, sent from a corresponding node to application module 1128 in end node 1128 is shown by a sequence of arrows 1320-1328 to be received by access node 1200, e.g., by way of network/internetwork interface module 1206, and then to proceed through a sequence of modules 1246-1254 included in access node 1200 for processing, after which the data information is sent from the access node 1200 to the end node 1100, e.g., via the wireless communication interface module 1208. Following reception by end node 1100, e.g., by way of wireless communication interface module 1104, the data information, e.g., traffic flows comprising a sequence of messages, packets, or frames, sent from the corresponding node to application module 1128 in end node 1100 is shown by a sequence of arrows 1330-1334 to proceed through a sequence of modules 1146 and 1148 included in end node 1100 for processing, prior to being delivered to the application module 1128 in end node 1100.

In addition to the exchange of data information, e.g., traffic flows, FIG. 13 also depicts the exchange of control information, e.g., signaling flows and/or communication interfaces. In particular, the FIG. 13 example depicts the exchange of control information between control signaling module 1226 and traffic control module 1228 included in access node 1200. Similarly, the FIG. 13 example depicts the exchange of control information between control signaling module 1126 and the traffic control module 1130 included in the end node 1100. In both access node 1200 and end node 1100, exchange of control information between the modules as shown allows the respective control signaling module 1226/1126 in the access/end node 1200/1100 to affect, e.g., set, modify, and/or monitor, the configuration and/or operation of the various modules included in the respective traffic control module 1228/1130, as needed to provide the proper quality of service treatment of the data information, e.g., traffic flows, to/from the application module 1128 in the end node 1100.

The exchange of control information, e.g., signaling flows and/or communication interfaces, is also shown a) between another node and control signaling module 1226 in access node 1200, b) between application module 1128 in end node 1100 and control signaling module 1126 in end node 1100, and c) between the respective control signaling modules 1226/1126 in access node 1200 and end node 1100. These exchanges of control information, e.g., signaling flows and/or communication interfaces, enable the configuration and/or operation of traffic control modules 1228/1130 in both access node 1200 and the end node 1100 to be affected by a) one or more additional nodes, e.g. the access control node 1020 and/or application server node 1026, b) application module 1128 in end node 1100, or c) a combination of one or more additional nodes and the application module 1128 in end node 1100. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for selectively receiving media streams broadcast at an event for viewing, comprising:
    receiving a first plurality of media streams generated at an event;
    enabling a wireless terminal to receive the first plurality of media streams broadcast over at least one media distribution system (MDS) on a wireless network in which a service provider operates a signal on a dedicated frequency inside a location of the event that is treated as a separate wireless network from a large area network, wherein the separate wireless network is substantially limited in range to the location of the event and the large area network provides a second plurality of media streams; and
    interfacing to the first plurality of media streams in order for the wireless terminal to select a subset of the first plurality of media streams for viewing.

2. The method of claim 1, wherein the first plurality of media streams include video data, audio data, or textual information.

3. The method of claim 1, further comprising monitoring radio frequency (RF) allocation tables in the separate wireless network.

4. The method of claim 1, further comprising selecting the subset of the first plurality of media streams from a program guide.

5. The method of claim 1, further comprising generating multiple camera views at the wireless terminal.

6. An apparatus, comprising:
    a memory that retains instructions configured to cause a processor to perform operations comprising:
        receiving a first plurality of media steams generated at an event;
        enabling a wireless terminal to receive the first plurality of media streams broadcast over at least one media distribution system (MDS) on a wireless network in which a service provider operates a signal on a dedicated frequency inside a location of the event that is treated as a separate wireless network from a large area network, wherein the separate wireless network is substantially limited in range to the location of the event and the large area network provides a second plurality of media streams; and
        interfacing to the first plurality of media streams in order for the wireless terminal to select a subset of the first plurality of media streams for viewing; and
    a processor that executes the instructions to perform the operations.

7. The apparatus of claim 6, further comprising a component to enable a device to receive the first plurality of media streams.

8. A communications apparatus, comprising:
    means for receiving a first plurality of media streams generated at an event;
    means for enabling a wireless terminal to receive the first plurality of media streams broadcast over at least one media distribution system (MDS) on a wireless network in which a service provider operates a signal on a dedicated frequency inside a location of the event that is treated as a separate wireless network from a large area network, wherein the separate wireless network is substantially limited in range to the location of the event and the large area network provides a second plurality of media streams; and
    means for interfacing to the first plurality of media streams in order for the wireless terminal to select a subset of the first plurality of media streams for viewing.

9. A non-transitory computer readable storage medium having stored thereon-computer-executable instructions configured to cause a computer to perform operations comprising:
    receiving a first plurality of media streams generated at an event;
    enabling a wireless terminal to receive the first plurality of media streams broadcast over at least one media distribution system (MDS) on a wireless network in which a service provider operates a signal on a dedicated frequency inside a location of the event that is treated as a separate wireless network from a large area network, wherein the separate wireless network is substantially limited in range to the location of the event and the large area network provides a second plurality of media streams; and
    interfacing to the first plurality of media streams in order for the wireless terminal to select a subset of the first plurality of media streams for viewing.

10. The apparatus of claim 6, wherein the first plurality of media streams include video data, audio data, or textual information.

11. The apparatus of claim 6, wherein the memory retains instructions configured to perform operations further comprising monitoring radio frequency (RF) allocation tables in the separate wireless network.

12. The apparatus of claim 6, wherein the memory retains instructions configured to cause a processor to perform operations further comprising selecting the first plurality of media streams from a program guide.

13. The communications apparatus of claim 8, wherein the first plurality of media streams include video data, audio data, or textual information.

14. The communications apparatus of claim 8, further comprising means for monitoring radio frequency (RF) allocation tables in the separate wireless network.

15. The communications apparatus of claim 8, further comprising means for selecting the first plurality of media streams from a program guide.

16. The non-transitory computer readable storage medium of claim 9, wherein the first plurality of media streams include video data, audio data, or textual information.

17. The non-transitory computer readable storage medium of claim 9, wherein the stored computer-executable instructions are configured to cause the computer to perform operations further comprising monitoring radio frequency (RF) allocation tables in the separate wireless network.

18. The non-transitory computer readable storage medium of claim 17, wherein the stored computer-executable instructions are configured to cause the computer to perform operations further comprising selecting the first plurality of media streams from a program guide.

* * * * *